US008489925B1

(12) United States Patent
Antukh et al.

(10) Patent No.: US 8,489,925 B1
(45) Date of Patent: Jul. 16, 2013

(54) SYSTEM AND METHOD FOR PROCESSING OF SYSTEM ERRORS

(71) Applicants: Alexander E. Antukh, Moscow (RU); Alexey V. Malanov, Moscow (RU)

(72) Inventors: Alexander E. Antukh, Moscow (RU); Alexey V. Malanov, Moscow (RU)

(73) Assignee: Kaspersky Lab, ZAO, Moscow (RU)

( * ) Notice: Subject to any disclaimer, the term of this patent is extended or adjusted under 35 U.S.C. 154(b) by 0 days.

(21) Appl. No.: 13/673,041

(22) Filed: Nov. 9, 2012

(51) Int. Cl.
*G06F 11/00* (2006.01)
(52) U.S. Cl.
USPC .............................. 714/26; 714/28; 714/38.1
(58) Field of Classification Search
USPC ............................................ 714/26, 28, 38.1
See application file for complete search history.

(56) References Cited

U.S. PATENT DOCUMENTS

| | | | | |
|---|---|---|---|---|
| 5,805,776 | A * | 9/1998 | Juengst et al. ................... 706/59 |
| 6,978,401 | B2 * | 12/2005 | Avvari et al. ............... 714/38.13 |
| 8,074,115 | B2 * | 12/2011 | Stolfo et al. ................. 714/38.1 |
| 8,229,727 | B2 * | 7/2012 | Gupta et al. ..................... 703/23 |
| 2004/0255194 | A1 * | 12/2004 | Genkin et al. .................... 714/28 |
| 2006/0195745 | A1 * | 8/2006 | Keromytis et al. ............ 714/741 |
| 2008/0250365 | A1 * | 10/2008 | Chou et al. ......................... 716/5 |
| 2012/0151270 | A1 * | 6/2012 | Stolfo et al. ................. 714/38.1 |

* cited by examiner

*Primary Examiner* — Charles Ehne
(74) *Attorney, Agent, or Firm* — Bardmesser Law Group (57) ABSTRACT

A system and method that handles and prevents application installation and execution errors in computer systems using an expert data acquired by analysis of the application and errors detected in the emulator. The system also handles the errors raised during an application update. The system allows for testing of applications for execution on a system with a particular configuration. The system can determine all possible errors that can be raised in different execution environments. Additionally, the system can determine system error causes and modify the computer system in order to prevent the system errors. An automated analysis of the application execution in the emulated execution environment is performed. An expert system of error handling scenarios is formed based on the emulation. The system includes an emulator, an expert system, an expert database and an error processor.

20 Claims, 7 Drawing Sheets

SYSTEM AND METHOD FOR PROCESSING OF SYSTEM ERRORS

BACKGROUND OF THE INVENTION

1. Field of the Invention

The present invention is related to error handling and, in particular, to a method and system for processing system errors caused by execution or installation of software applications.

2. Description of the Related Art

One of the important characteristics of software applications is application stability when running under different hardware and software configurations of the computer systems. Application developers generally strive for producing software applications that do not cause fatal errors in the computer system.

Typically, an application installer is used for an automated installation of the software. The application installer installs the application according to system configuration and the execution environment. However, it is not possible to foresee execution of a particular application on every one of a variety of user systems. Also, the application cannot be tested on each of the user systems, and it cannot be modified for each system. Even if standard computer systems are used, the application can execute differently on different systems based on minor configuration differences.

Therefore, each application must be able to effectively handle the errors caused by its execution on a computer system. Effective error handling is needed for user support and efficient correction of the application and for providing updates and patches. Correction and update of the application is particularly important for applications that provide services to other applications as well as for application libraries.

Application development always leaves room for execution errors based on the execution environment and the system configurations. This needs to be taken into account when new software is installed, or when application modules are updated, or when some applications run concurrently.

Accordingly, a system that can determine possible system errors, analyze their causes and eliminate the errors, is needed. The system also needs to be able to correctly process the errors when they are triggered in a computer system.

Existing systems test applications in an emulated execution environment. The emulated execution environments can simulate different system states in order to detect the potential execution errors. Such a system is described in the U.S. Pat. No. 7,203,881. However, not all of the errors detected by simulation can be corrected by correction of the application code. Thus, the problem of error handling after installation and execution of the application becomes critical as a number of applications, updates and application versions grow.

A system described in U.S. Pat. No. 6,378,128 allows for correction of an application installer in order to solve application execution problems. However, this system is ineffective in case of installation of the applications in an enterprise network with a large number of the workstations that can require unique application installers.

Another solution for handling installation errors is performing a system roll-back and using virtualization means for re-installation of the application. This method is described in U.S. Patent Publication No. 2006/0168165 and U.S. Pat. No. 6,691,250. However, these methods do not allow for determination of the error causes. Conventional administration systems have special tools for tracking the system errors. However, the errors are traced and analyzed only after their detection in the real system.

Accordingly, a system and method that effectively handles and prevents application installation and execution errors in computer systems is desired.

SUMMARY OF THE INVENTION

The present invention is related to error handling during software application installation and execution. The present invention provides a method, system and computer program product for error handling and processing the system errors caused by installation and/or execution of the software applications that substantially obviates one or several of the disadvantages of the related art.

In one aspect of the invention, a system and method that effectively handles and prevents the application installation and execution errors in the computer systems using an expert data acquired by analysis of the application and errors in the emulator is provided. An exemplary embodiment also handles the errors triggered during an application update.

The exemplary embodiment allows for testing of the applications for execution on a system with a particular configuration. The exemplary embodiment can determine all possible errors that can be raised in different execution environments. Additionally, the exemplary embodiment can determine the system error causes and modify the computer system in order to prevent the system errors.

According to the exemplary embodiment, an automated analysis of the application execution in the emulated execution environment is performed. An expert system of error handling scenarios is formed based on the emulation. The system, in accordance to the exemplary embodiment, includes an emulator, an expert system, an expert database and an error processor.

The emulator reproduces a state of a computer system in order to trigger an application execution error raised in this particular computer system state. The emulator determines at least one error caused by the application execution conditions. The expert system is connected to the emulator. The expert system generates at least one error handling scenario (script) for the error detected by the emulator.

The expert database is updated. An error identifier (i.e., the conditions under which the error had occurred) and at least one error handling (processing) scenario for a particular application are stored into the expert database. The expert database is accessible by an error processing module. The error processing module detects application execution errors on a computer system. Then, the error processing module loads a corresponding error processing scenario from the expert database and executes the error processing scenario (script).

In one embodiment, the application that raises the error is a software installer. The error processor can modify a state of a computer system in order to prevent the known errors. The state of the computer system is defined by the system configurations, a set of installed applications, by a set of hardware used, by data stored in a system memory and by network connections.

In one embodiment, the emulator emulates at least a functionality of a computer system processor and a memory. The emulator can emulate the state of the computer system and modifies at least one operating system API function value. According to the exemplary embodiment, the system can process the errors caused by exceptions, the error code returns, errors detected by system events processor, variable values errors, etc.

The error processing scenario is a sequence of commands (instructions) for configuration of the computer system in order to eliminate errors. Alternatively, the error processing scenario (script) has a sequence of the commands that pass the error-related data to an administration server.

Additional features and advantages of the invention will be set forth in the description that follows, and in part will be apparent from the description, or may be learned by practice of the invention. The advantages of the invention will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE ATTACHED FIGURES

The accompanying drawings, which are included to provide a further understanding of the invention and are incorporated in and constitute a part of this specification, illustrate embodiments of the invention and, together with the description, serve to explain the principles of the invention.

In the drawings.

DETAILED DESCRIPTION OF THE PREFERRED EMBODIMENTS

Reference will now be made in detail to the preferred embodiments of the present invention, examples of which are illustrated in the accompanying drawings.

According to the exemplary embodiment, a method, system and computer program product for processing system errors caused by installation and/or execution of software applications are provided. According to one exemplary embodiment, the installer applications are analyzed for potential errors. The emulator reproduces a state of a computer system in order to trigger an application execution (or installation) error raised in this particular computer system state. The emulator determines at least one error caused by the application execution/installation conditions. The expert system connected to the emulator generates at least one error handling scenario (script) for the error detected by the emulator.

An error identifier (i.e., the conditions under which the error had occurred) and at least one error handling (processing) scenario for a particular application are stored into the expert database. The error processing module detects application execution errors on a computer system. Then, the error processing module loads a corresponding error processing scenario from the expert database and executes the error processing scenario (or script).

Typically, software applications are distributed in a compressed (auto-unpackable) form. The installation process includes a system test for meeting the technical requirements for the application, unpacking, and placement of files into the correct directories on the disk. The installation process can also include modification of some parameters of the execution environment.

Some installers download files from the Internet and do not contain actual application files. Some installers use a packed application installation that uses special processing for packed applications. The installer application can check for user system requirements. For example, the installer can check for:

read/write access to a required file(s);
sufficient disk space;
required libraries;
computational requirements of a processor, memory and a video controller;
accessibility of a remote network resource(s); and
arbitrary system parameters.

The system errors or exceptions are triggered by execution of operations that meet certain conditions. Once these conditions are met, an error code (i.e., an error identifier) is returned. If the problem had been considered by the software developer, the exception processor is called. Otherwise the error is unfixable and the error or interrupt is processed by the operating system.

The error codes can be used as a function return code. The function return code can indicate a successful execution or an error. The error code can be returned by different operators as function return values (codes), as shown below:

int main( )
{If <condition1> return 001; // if condition check showed discrepancy
If <condition2> return 002;
return 1; // if no error codes are generated, the function returns a value of one}

The return error codes for Adobe Flash Player are:
2048: Unhandled Security Error
2032: Stream Error
19166: Flash installation files corrupted or conflicting system permissions
1721: There is a problem with this Windows Installer package For example, the return codes for Java 6.0 are:
Error 1330. A file that is required cannot be installed because the cabinet file \Java\jre1.6.0_13\Data.cab has an invalid digital signature. This may indicate the file is corrupt.
Error 1316. A network error occurred while attempting to read from the file <file>
Error 25099. Unzipping core files failed Global variable are used for storing the errors. For example, in the "C" language, the errors are stored in the "errno" variable:
FILE *file=fopen("filename", "r");
if (fp==NULL) printf("Cannot open file, error % d \n", errno);

In Microsoft Windows, OS error codes are used as well. Alternatively, exception calls are used. The exceptions are applied when a state of data, I/O devices or a state of the entire system makes program execution impossible (or does not make any sense). Each exception can be processed with a return (i.e., the program corrects an error and continues to execute) or without a return (i.e., control is given to another pre-defined program module).

Most of the modern programming languages such as C++, Delphi, Objective-C, Java, Ruby, Python, PHP, all ".NET" languages and etc. have a built-in support for processing of exceptions. Once the exception is raised, a first suitable (by type) exception processor is selected from a call stack and the control is given to this exception processor. Note that standard error processors do not normally permit determining the cause of the error. Also, not all errors are adequately described in the relevant documentation.

When an extra ordinary situation occurs, an exception is generated. From a program point of view, the exception is a data object containing exception parameters (i.e., for example, causes of the exception). The above processing methods are used in program code writing. The software developer knows all possible errors that can occur within the application or in the computer system. Thus, the error handling is performed within the application itself.

In some cases, a list of processed errors and exceptions is needed for an already compiled program. This can be critical for application testing and for safety considerations. Such a list can also be needed for poorly documented applications. Typically, software developers do not always provide a complete list of errors and do not describe error causes and ways of correcting and preventing them.

A method, in accordance to the exemplary embodiment, determines a complete list of the error codes in a third party application. The proposed method determines the conditions that triggered the error and suggests ways of error correction and prevention. The main problem of analyzing a third party application is that the code is not available. The third party applications are provided as an executable binary file.

According to the exemplary embodiment, the program logic is analyzed for possible errors by tracing the program, emulating the program execution, or by disassembling of the binary code. However, program execution in emulated, a virtual or an isolated environment in a standard mode does not allow for detection of a full list of possible errors. Unless the error is explicitly defined (i.e., the error occurs at a predetermined place), the exception call can occur at any moment. Thus, various scenarios of application behavior in various execution environments need to be emulated.

In general, a program execution algorithm can be represented by a tree-like structure of conditional moves. Each tree node checks for a particular condition, and the tree branches growing from the node represent the blocks of sequentially executed commands. One of the branches can represent the error or exception processing. The tree top represents a successful execution of the program or the error. This method analyses program executable code in order to form connections between the errors and the conditions that trigger the errors.

A computer program is a combination of command sequences for controlling computer system devices in order to execute a certain algorithm using particular sets of data. The program can be implemented as a set of objects or as source code. Modern programming languages compile the code into machine code instructions on-the-fly during the program execution. Some programs are stored on the disk as pre-compiled scripts (or scenarios). The scripts contain the source code and data.

When the program is stored on the disk as a pre-compiled executable file(s), the loading process is simple. The program image is transferred from the disk into the computer system operating memory. The executable file is a file that can be loaded into the memory and executed. In MS Windows OS, the executable files have extensions ".exe" and ".dll." The ".exe" files can be launched by a user. The ".dll" files have dynamic link libraries that export functions used by other programs.

Figure 1:
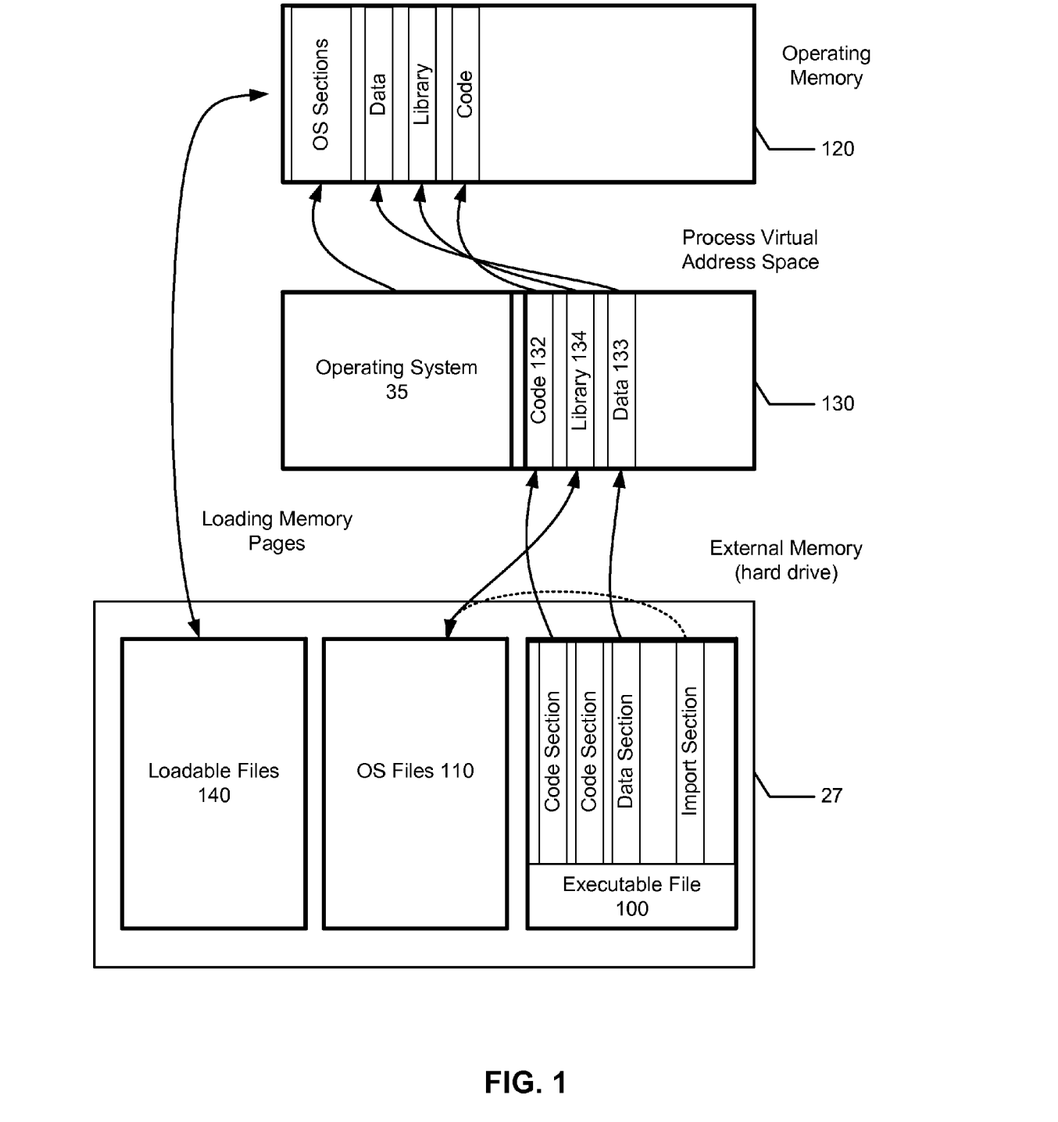
FIG. 1 illustrates an application execution on a computer system.

FIG. 1 illustrates an application execution on a computer system. An application, which can be a software installer, is represented by an executable file 100. Alternatively, the file 100 is not executable and requires a compiler. The executable file 100 is stored on a disk 27 or on an external memory. Applications are launched in OS 35. A special loader module creates a process and threads. The loader loads required code and data into the process memory and gives control to the application. A virtual memory 130 is allocated. An image of the file in the memory is identical to its representation 100 on the disk 27.

The loader only needs to copy certain parts of the file into the process address space and change global addresses in the executable code according to a relocation table. Then, the loader creates an import address table and passes the control to the entry point. Program execution requires libraries loaded from OS catalogs or from external library sets. The libraries have links located in an import section.

Thus, when launching a program, the loader performs the following actions: reads headers and other required sections of the executable file 100 being launched; loads the libraries 134, code 132 and data (resources) 133 into the memory; links addresses; creates a new process in the memory and plans for its execution. According to the exemplary embodiment, a process is an OS object containing a set of resources and a data 133 required for program execution.

Each process requires creation of at least one stream responsible for execution of the code 132. The stream contains the instructions. The instructions (or operating code) are the operations executed by the process. Modern processors use the instructions written in the assembler script and convert them into internal binary code commands. An OS scheduler allocates processor time, performs synchronization and determines code execution priority. After a process and a stream are created, the stream instructions are executed on the processor.

As the process streams are executed, memory sections from the virtual address space 130 are loaded into an operating memory 120. A real (physical) address, where the memory sections are located, is hidden to the process. The unused memory sections are transferred from the operating memory 120 onto the external memory 27 into the loadable files 140.

Figure 2:
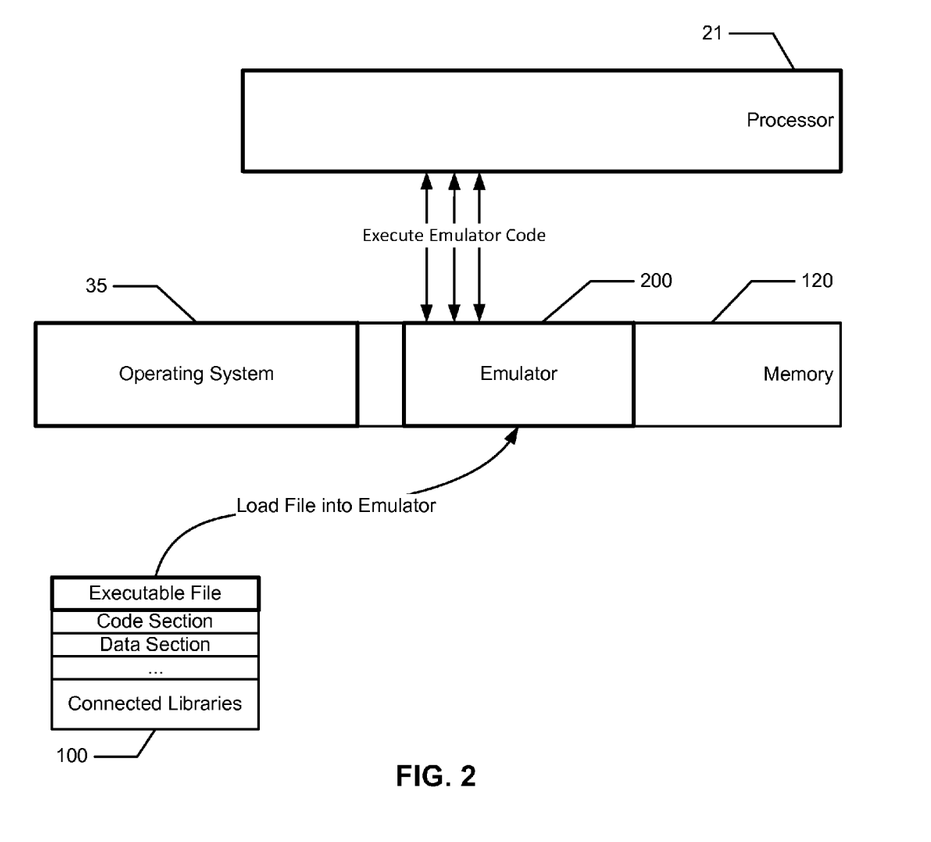
FIG. 2 illustrates an application execution in an emulator, in accordance with the exemplary embodiment.

Program execution in the emulator is different from standard execution. FIG. 2 illustrates an application execution inside an emulator, in accordance with the exemplary embodiment. According to the exemplary embodiment, the computer system has an emulator 200 implemented as a software module. Alternatively, the emulator can be implemented as a part of the OS 35 (e.g., as a driver) or as a separate device (e.g., as a programmed microprocessor.

The emulator 200 is loaded into the computer system memory 120 and runs on the processor 21. The emulator processes the executable file 100 along with its code. Note that the application to be analyzed is loaded into the emulator 200 address space. The emulator 200 (implemented as an application) processes the application code and allocates resources in a similar manner as the processor 21 and the OS 35.

Figure 3:
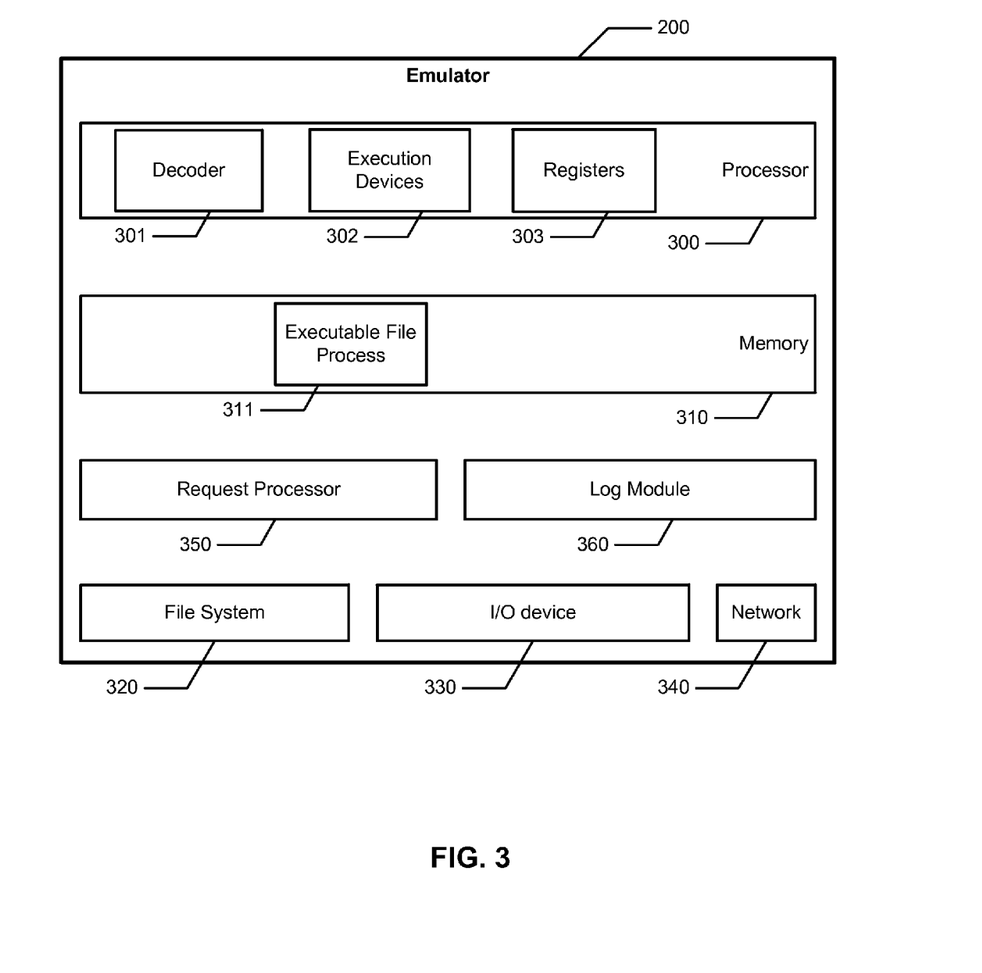
FIG. 3 illustrates an emulator architecture, in accordance with the exemplary embodiment.

FIG. 3 illustrates emulator architecture, in accordance with the exemplary embodiment. The emulator 200 emulates devices and applications of the computer system. The emulated environment communicates with the external object in the same manner as a real computer system. The emulator 200 can implement complete emulation of all software/hardware functionality including the system OS, all installed applications and the logics of all hardware devices and connections.

According to the exemplary embodiment, partial emulation of a computer system is sufficient. For example, calls (or requests) to the objects of the computer system that are not emulated are intercepted and redirected to the actual objects of the computer system. As one example, all the code can be executed on the real system, with only one function emulated, whose value is replaced so as to trigger an error. Operations that might not be emulated include, for example, empty cycles, decryption operations, deobfuscation operations, archive unpacking and so on. Other possibilities include some arithmetic and logic operations, working with memory (e.g., reading and writing based on pointers, etc.).

In one embodiment, in order to implement the emulator 200 for executing an application, a processor 300 and a memory 310 need to be emulated. The emulator 200 also includes a file system 320, I/O devices 330 and network devices 340.

In one exemplary embodiment, OS functions and external services can be emulated as well. The executable file process 311 is implemented in the emulator address space in the emulated memory 310. The program instructions are processed in the emulator 200 and can be, if needed, executed in the real environment. Processing of these instructions is performed by a request processing unit 350. Execution of the program instructions in the emulator 200 is traced by a log module 360.

According to one exemplary embodiment, the emulator 200 can be implemented similar to the request processor 350. In this implementation, the application is executed on a real computer system, but all of the application commands are intercepted, processed and logged for further analysis by the emulator 200. Thus, the emulation substitutes the results of some of the requests. For example, the emulation substitutes the results of the OS API calls. The processor 300 includes registers 303, execution devices 302 and a decoder 301.

Figure 4:
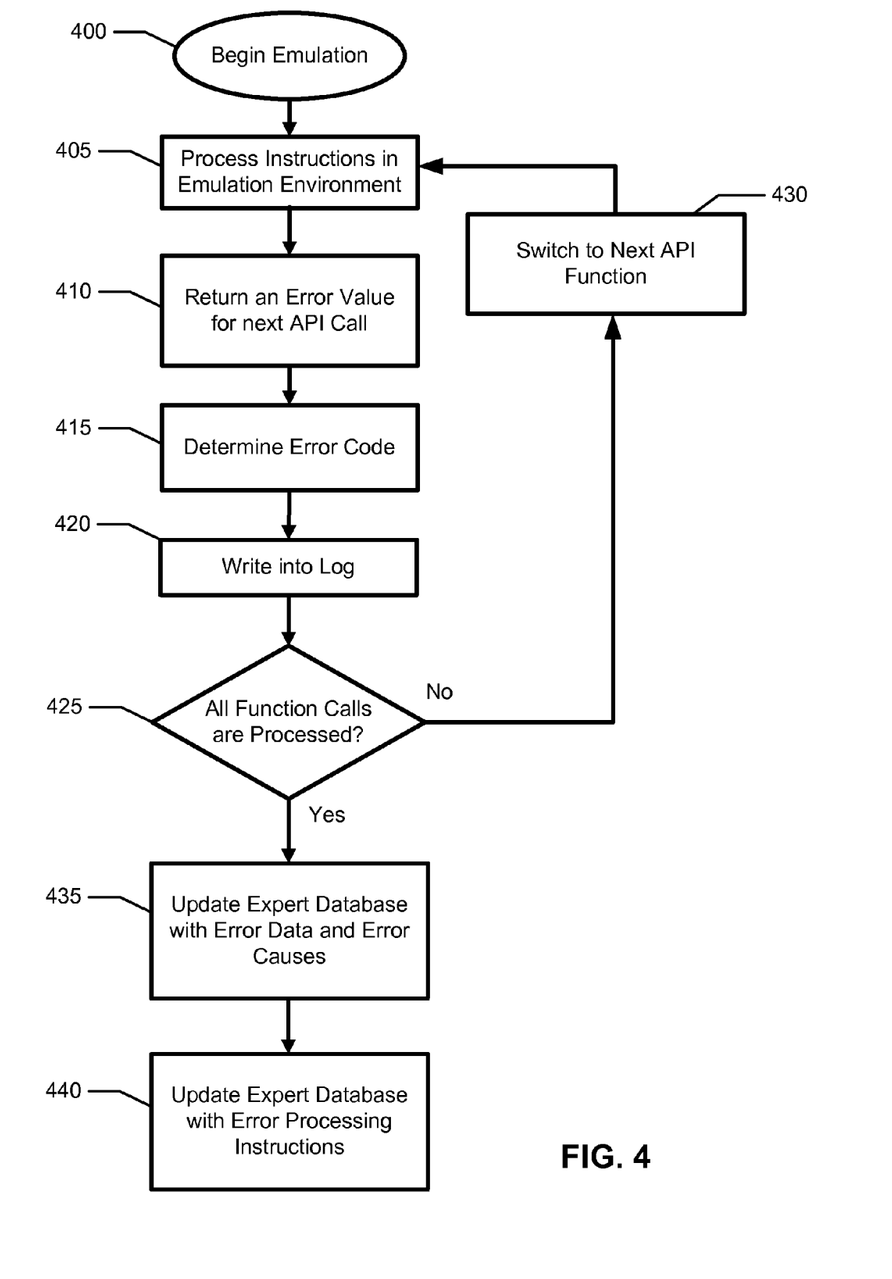
FIG. 4 illustrates a flow chart of emulator operation, in accordance with the exemplary embodiment.

FIG. 4 illustrates a flow chart of emulator 200 operation, in accordance with the exemplary embodiment. According to the exemplary embodiment, the emulator 200 determines a complete set of potential errors that can occur under various execution environments and on computer systems with different configurations.

The emulation begins in step 400. The application instructions are processed in the emulation environment in step 405. In step 410, an error value is returned for the next API call. Subsequently, a corresponding error code is determined in step 415. The error code and a program execution are stored into a log in step 420. In step 425, the emulator determines if all function calls have been processed. If all calls have been processed, the expert database is updated with the error data and error causes in step 435.

In step 440, the expert database is updated with the error processing instruction. If, in step 425, some function calls have not yet been processed, the emulator switches to the next API function in step 430 and repeats the steps 405 through 425.

The beginning of emulation in step 400 can be initiated by several events. For example, an application is launched for execution; the application files and processes are transferred to the emulator; an application that was previously analyzed is saved into the computer system memory or other system events. An event interception can trigger the beginning of the emulation. For example, a special driver for processing of the OS calls can perform the interception of the events, such as described, e.g., in U.S. Pat. No. 6,779,187.

Note that there is a set of functions that do not produce any meaningful results, even if thoroughly analyzed, for example, hap:**msdn.microsoft.com/ru-ru/library/windows/apps/xaml/hh452772.aspx, such as system time, user interface functions, and so on. In order to speed up the process, these functions are omitted and a number of the emulation cycles are reduced. A list of functions that do not carry any weight in terms of error handling is created. This list is constantly updated and modified, usually by specialists at the antivirus labs.

For example, an application is traced and some functions do not affect the returned error codes. A function CreateFileW did not get access to the file "eb0.tmp," because the file is in use. A number of function calls have occurred, and a final call ExitProcess with a return code 0x401 has occurred as well. A call log contains function call sequences and corresponding results reflecting return values that have been modified (see appendix i).

Those skilled in the art will appreciate that this approach can optimize function analysis and reduce error detection time. According to the exemplary embodiment, a description is generated for each error. The description includes at least conditions that triggered the error, the error causes and the error prevention method(s), any user notifications, logs transmitted to a system administrator's server, etc.

According to the exemplary embodiment, the processor 300 (see FIG. 3) has x86 architecture. This architecture has a set of processor commands, a memory access scheme, a command decoding table, etc. Additionally, the processor can have optimization commands used for special execution modes.

The processor 300 includes the execution devices 302 that execute the instructions. The execution devices can be arithmetic-logical units (ALU) and calculation units with floating point (FPU). Note that stream commands are different from operations performed by the execution devices. Thus, the operations of the execution devices are simplified, and the processor speed is increased. The decoder 301 is used in order to convert x86 compliant code into internal commands of the execution devices, although there is no need to reproduce the entire functionality of the processor in the emulator.

A processing cache also speeds up program execution. The processing cache is a temporary fast access memory. When the stream is executed, the resources loaded from the process are stored in the cache and overwrite outdated data. Before loading data from the memory, the processor 300 checks if the data is available in the cache. Thus, program execution time is saved. Modern processors support multi-level caching separating a data cache, an instruction cache, a mixed data cache, etc.

The fastest memory units are the registers 303 located in the processor kernel. A 32-bit processor contains eight common registers used for storing data and addresses, six segment registers, state and control registers and special registers. The processor can operate in a real or in a safe mode. The operation modes can be switched automatically. In the real mode the processor executes 16-bit commands and uses 20-bit addresses. In this mode, the address space of one program is not protected from another program.

The modern OS support multi-tasking using a protected mode. The address spaces of separate tasks are isolated from each other. An application running under the OS cannot affect integrity of the OS in the protected mode. The application can only write data into memory areas allocated by the OS. The protected mode provides for page memory control. The memory is divided into pages from 512 bytes to several KB.

Note that all process streams are executed in a common address space allocated at the process initiation. In the 32-bit systems, the memory volume available to each process is 4 GB. The upper portion of this space is reserved by the OS and the other half is available to user applications. A virtual memory allows for an isolation of the processes. Meanwhile, the streams of one process can reference to the address space of another process.

Note that the virtual memory 130 (see FIG. 1) may not reflect the structure of the physical memory 120. A memory dispatcher translates the virtual addresses into the physical ones that point to the actual data. Note every computer system can allocate 4 GB of physical memory for each process. Memory swapping mechanism is used to solve this. OS moves some of the memory data onto a disk (into a swap file or a page file). Thus, the physical memory is freed up for other processes.

When the stream accesses the page of the virtual memory written to the disk, the virtual memory dispatcher loads the corresponding data from the disk back into the memory. Emulation of the processes often requires file system emulation. This is especially critical when disk data needs to be protected or when the file access is limited. From the OS point of view, the disk is a set of clusters. The file system drivers organize clusters into the files and catalogs. When an application accesses a file, the file system determines the clusters where the file is located and sends the read request to the disk drive for reading the required sectors.

In cases when the application interacts with a network or external devices (I/O devices and printers), the emulation requires emulating the functionality of these devices. The commands, directed to the external devises, need to be processed and responses need to be emulated. Processing of the executable file produces a machine code stored in the process memory. In order to process a command, the emulator needs to emulate the operation of the processor—i.e., execute the command in the emulated environment.

For example, a command for copying (MOV), having two parameters Des (destination address) and Source (source of copying), is implemented by one internal operation Dest:=Source (for x86 processors). Some commands are executed as several operations. For example, a command Exchange uses different values stored at two addresses. The Exchange command is implemented by two operations Op1:=Op2, Op2:=Op1.

According to one exemplary embodiment, each emulated module can be implemented as a class object: a register class, a memory class, a processor class, etc. The class methods re-create real objects. In case of a processor, the class methods represent a set of executable instructions and internal commands. In case of memory emulation, the class methods are read and write operations.

Note that most of the arithmetic operations and operation for address calculations are included in programming languages and are easy to emulate. Other commands can be implemented as separate functions. The emulator can be implemented as a microprocessor. Modern OSs implement communications between the applications and computer system devices (i.e., for example, file opening or loading of a web page) via Application Programming Interface (API) functions. The sequence of the functions called during the execution defines a behavior scenario of the application. In some cases, the purposes of the application can be determined and the code can be identified. Typically, the set of function calls or APIs used by the application, or objects requested by the application, identifies the application. For example, if an application downloads data from a webserver using HTTP through port 80, then it is most likely a browser.

In order to estimate stability of the application, the API functions called by the installer (or the application itself, especially, at a launch point) can be analyzed. Typically, function calls are used for checking the system for compliance with certain required condition(s). A table of connected libraries and addresses of the called functions is included in the executable file.

When an application is loaded into the emulator, the addresses are replaced by the emulator processor address. Emulation process (operations and calls) are logged. The log data can reflect the sequence of the events, as well as the error codes and exceptions. A following example represents program tracing, where the emulation log includes a list:

[04bc] GetProcAddress(0x1a400000→"C:\WINDOWS\system32\urlmon.dll", 0x0040304e

[04bc] URLDownloadToFileA(NULL, 0x00403061→"http://website.com/img.jpg", 0x004030c5→"c:\\boot.bak", 0x0, NULL), [MD5=B25420887F0EE89C76800BDC1A01BFA4, File="C:\boot.bak"]=>0x0

[04BC] Sleep(0x5E7)=>0x0

[04BC] DeleteFileA(0x004030C5→"c:\\boot.bak"), [File="C:\boot.bak"]=>true

[04BC] URLDownloadToFileA(NULL, 0x0040308F→"http://website.com/img.gif", 0x004030B9→"c:\\4591.exe", 0x0, NULL), [MD5=AF5B5C356CD1AAE8A7AC062F3A65529E, File="C:\4591.exe"]=>0x0

[04BC] WinExec(0x004030B9→"c:\\4591.exe", 0x0), [PID=0x4C0, TID=0x4C4, File="C:\4591.exe"]=>0x21

The exemplary list contains function calls that use certain parameters. The main task is to determine application behavior, if the function call results in an error. Thus, each API function returns an error code to the application instead of the expected value. According to one exemplary embodiment, the errors are returned sequentially (ordered for each function). For example, at the first emulation cycle, the application is "deceived" and the function call GetProcAddress returns 0, even if in a real system this call would have returned a different value (0x1a494bbe) indicating successful execution.

At the second emulation cycle, the function call URLDownloadToFileA returns a non-zero value (0xFFFFFFFF). At the third cycle, the call Sleep returns 0. At the fourth cycle, DeleteFileA returns false, etc. Note that at each cycle (launch), the application is emulated to its end, because the function call returns deliberately modified values. Each emulation cycle is logged. None-zero return code indicates certain conditions that need to be considered at application launch or installation.

For example, if the function URLDownloadToFileA is not present in the library, error code 3333 is generated. If a connection to URL cannot be established, error code 3334 is generated. If the system cannot transform into a Sleep mode, the application is terminated. If a file cannot be deleted, error code 7777 is produced, etc. In order to produce result in a form of a cause-effect chain (where function call error interpretation is a cause and an error code is an effect) an application can be tested in a real environment.

A system configuration can be changed, if needed, or the application can be launched in the environment where one of the required conditions is not present. If the return code matches the emulation result, the cause-effect chain is confirmed. For example, if an attempt to launch an application on a system disconnected from the Internet results in error code 3334, then the cause determined by the emulation is correct.

Note that other conditions required for the application need to be met. Otherwise, the application execution can return another error code prior to reaching the condition that is being tested. The emulation, in accordance to the exemplary embodiment, can be implemented as centralized service of a network connecting a large number of user computers.

Figure 5:
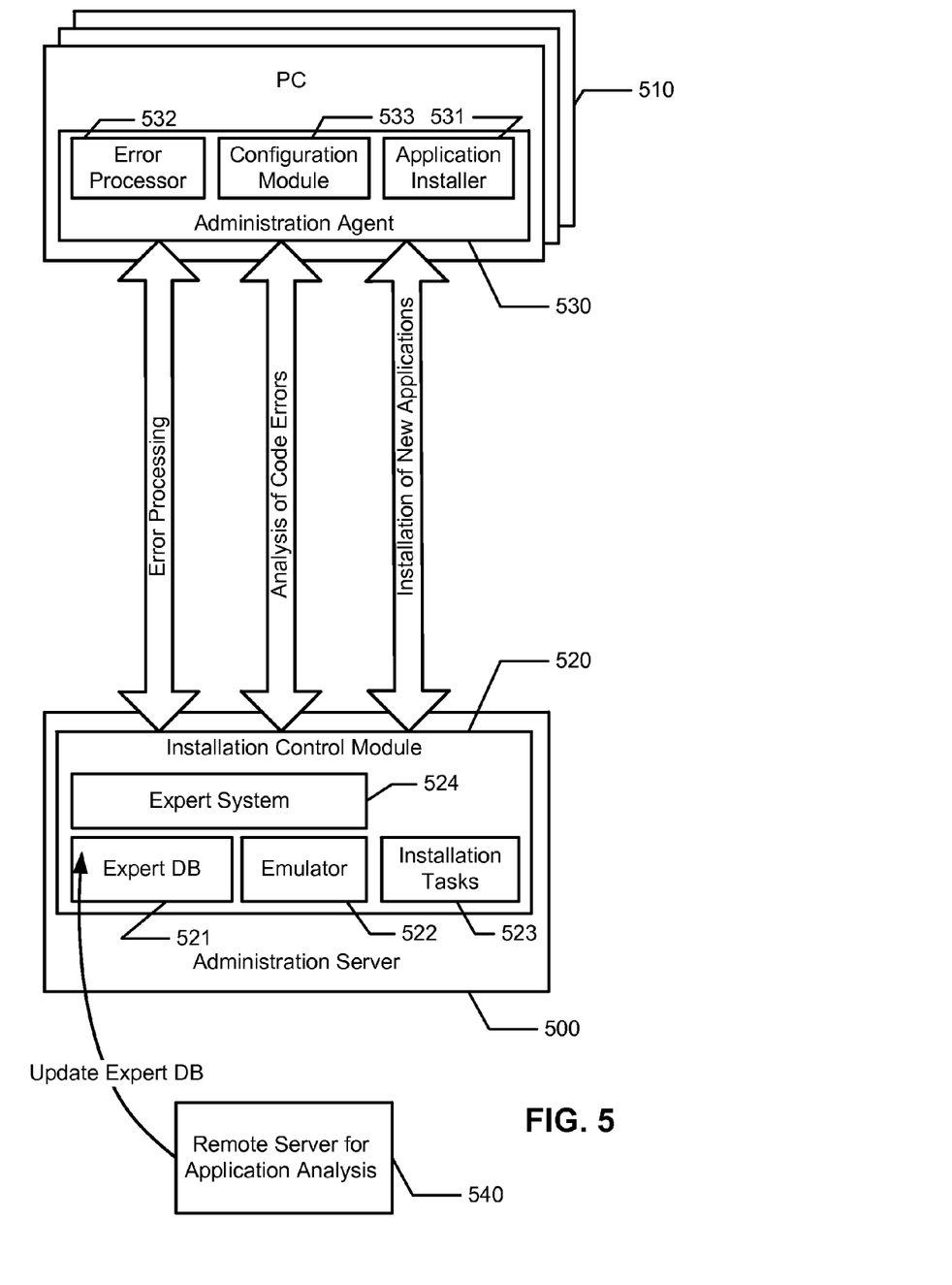
FIG. 5 illustrates architecture of a system for automated error handling, in accordance with the exemplary embodiment.

FIG. 5 illustrates architecture of a system for automated error handling, in accordance with the exemplary embodiment. The system includes an administration server 500 and administration agents 530. The administration agents 530 are installed on user computers 510 (or on mobile devices) connected to the administration server 500. The administration agents 530 collect data related to execution of program instructions, system configurations, system events processing and errors.

An installation control module 520 is implemented on the administration server 500. The installation control module 520 controls the administration agents 530 and forms installation tasks 523 for new applications. The installation control module 520 also analyses possible installation errors. The installation control module 520 collects and stores the expert data required for error handling and configuration of the computer systems.

According to the exemplary embodiment, a list of new programmable components to be installed can be generated manually or automatically. For example, new tasks 523 can be generated when updates or new versions of the applications are released. After the task 523 is formed, the application needs to be installed on the user computers 510 (transparently for the users). The installation transparency means that, in case of a system error, the user does not need to perform any actions, install additional devices, create connections, install drivers, configure the system components, etc. Thus, all possible errors can be known in advance and the errors need to be processed automatically.

According to the exemplary embodiment, a file or several files containing program code are analyzed. The file can have a source code, an executable file, a special format file that is used to recreate a program execution or at least program logic. Certain execution conditions are emulated in the emulator 522. The emulation results (in a form of an error tree, including error causes and prevention means) are saved into an expert database 521. The emulation results are used for system configuration and application testing.

An expert system 524 implements rules (instructions) for avoiding or correcting errors. Each error can have a separate rule for error handling. The rule can be connected to a particular API function that triggers an error once it is called. Alternatively, a rule can be created for the entire application. For example, if an error is generated due to unsuccessful file access, the rule finds (in the expert database) a corresponding solution, which will change the file attributes and file access rule configuration.

Once the administration agent 530 receives the installation task 523, the administration agent 530 launches an application installer 531 along with the related expert data. The expert data can contain configuration recommendations and additional program modules required for error free installation. A configuration module 533 configures the computer system 510. In one embodiment, the configuration module 533 and the application installer 531 are implemented as a built-in service of the OS.

Alternatively, a user can perform the installation by loading the installer and executing it. However, in this case, the error handling may not be possible without support of administration services. The automated error handling system employs an error processor 532 implemented on the user computer 510. The error processor 532 intercepts the error code, accesses the expert database 521 and acquires data needed for preventing the future error.

The expert database 521 is updated upon analysis of the applications. According to the exemplary embodiment, the expert database 521 can be stored on the administration server 500, on user PC 510 or on the remote server 540 accessible over the Internet. Distributed expert databases can be beneficial. For example, if a solution for an error is not found in the local expert database, a request is sent to the administration server 500. A central laboratory for application analysis and storing and synchronization of the expert data can also be used as a centralized service. Alternatively, the error handling system can be de-centralized, for example, employing peer-to-peer networks.

Figure 6:
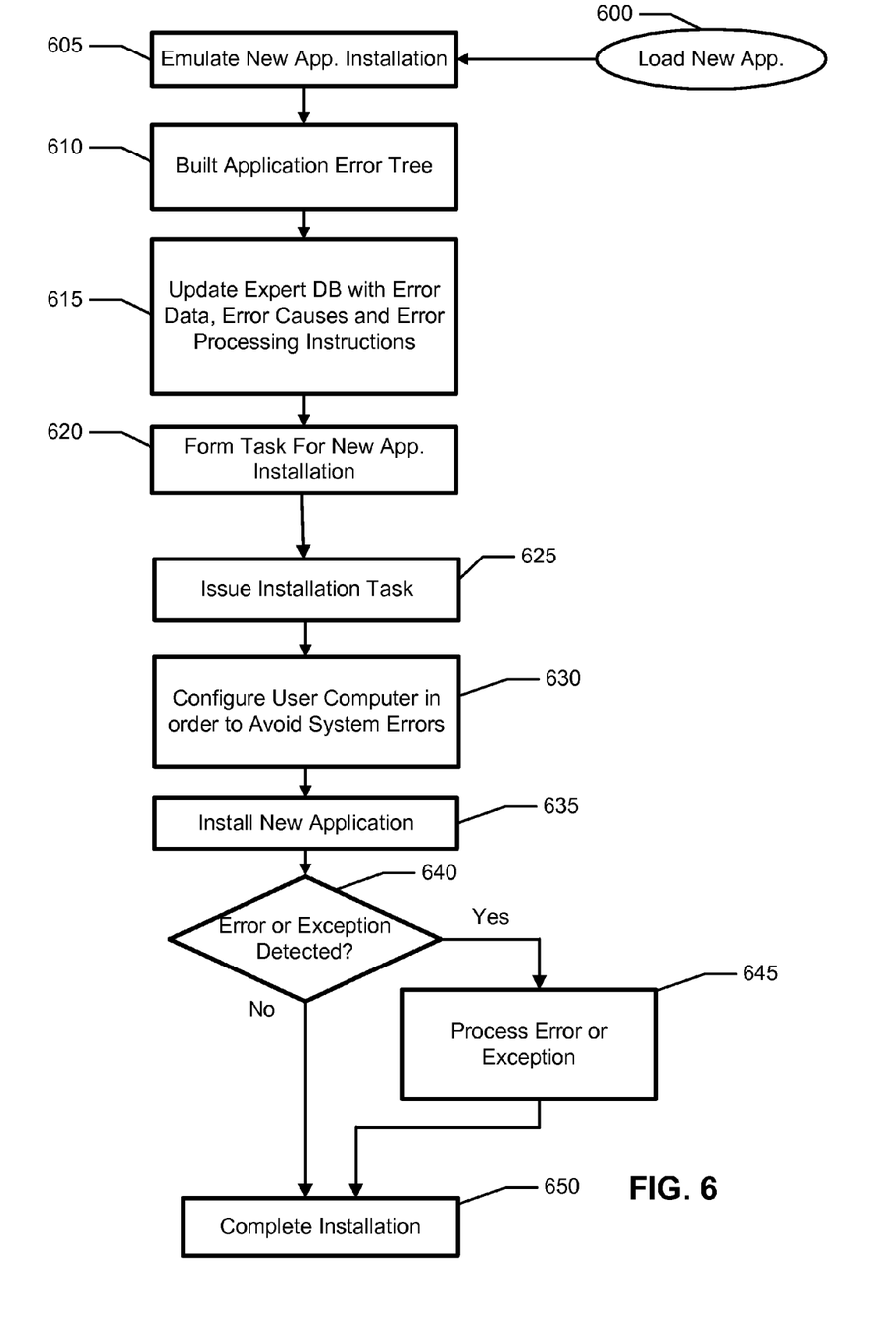
FIG. 6 illustrates a flow chart of a method used in the automated error handling system, in accordance to the exemplary embodiment.

FIG. 6 illustrates a flow chart of a method used in the automated error handling system, in accordance to the exemplary embodiment. A new application or an update is loaded in step 600. The application (or update) needs to be tested for its compliance with the execution environment. Thus, in step 605, the application installation process is emulated. The emulation recreates the execution environment (processor, memory, OS, file system, etc.). If certain objects are not emulated, the requests are redirected to the real objects.

For example, some program instructions can be executed on the real processor. The API function call can be directed to the real OS. An example of this is described in U.S. Pat. No. 7,603,713. A request to the web service can be sent over a network connection. Subsequently, an error tree is built in step 610. The error tree reflects a cause-effect relationship between the returned error and the conditions that triggered the error reflected in the emulation log. An error correction script is generated for each detected error.

In step 615, the expert database is updated with the error-related data. Then, in step 620, a task for application installation is formed. The installation task is issued in step 625. The installation task contains an installer (or a reference to the installer). The installation task also contains the instructions for required system configuration. These instructions can be added to the task from the expert database. The user computer is configured in step 630. Note that prior to configuration, the computer system can be tested in order to determine the conditions that do not meet the configuration requirements defined by the application to be installed.

In step 635 the application is installed. The installation includes unpacking, copying and creation of files, editing of the system registry, remote server registrations, etc. The errors and exceptions can occur during the installation. If the errors or exceptions are detected in step 640, they are automatically processed in step 645. The error processing in step 645 includes execution of the correction instructions and the user/administrator notifications. The installation is completed in step 650 after all errors have been processed.

Those skilled in the art will appreciate that proposed method and system improve the efficiency and the speed of the error handling during execution or installation of the software applications.

Figure 7:
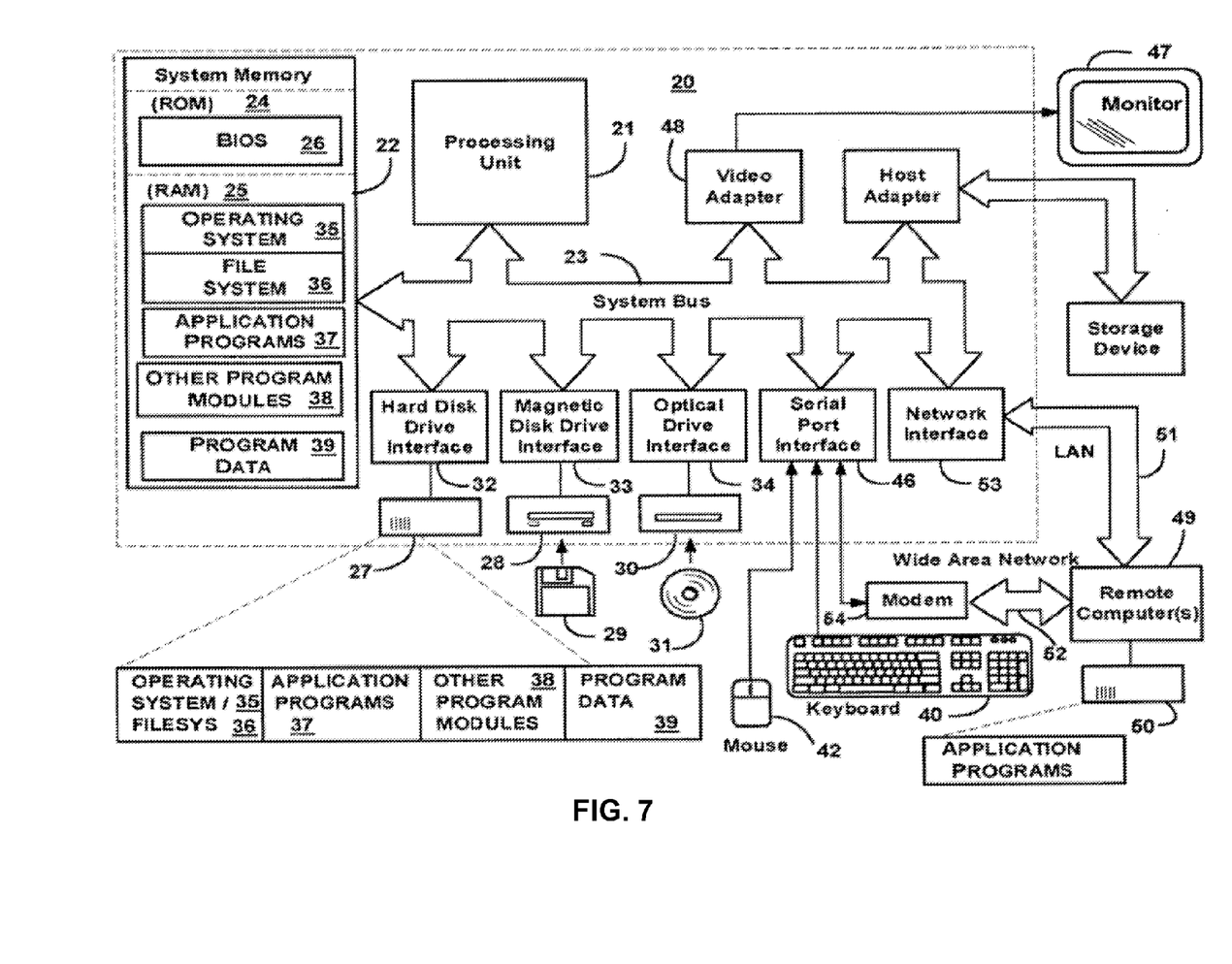
FIG. 7 illustrates a schematic of an exemplary computer system that can be used for implementation of the invention.

With reference to FIG. 7, an exemplary system for implementing the invention includes a general purpose computing device in the form of a computer/server 20 or the like, including a processing unit 21, a system memory 22, and a system bus 23 that couples various system components including the system memory to the processing unit 21.

The system bus 23 may be any of several types of bus structures including a memory bus or memory controller, a peripheral bus, and a local bus using any of a variety of bus architectures. The system memory includes read-only memory (ROM) 24 and random access memory (RAM) 25. A basic input/output system 26 (BIOS), containing the basic routines that help transfer information between elements within the computer 20, such as during start-up, is stored in ROM 24.

The computer 20 may further include a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD-ROM, DVD-ROM or other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide non-volatile storage of computer readable instructions, data structures, program modules and other data for the computer 20.

Although the exemplary environment described herein employs a hard disk, a removable magnetic disk 29 and a removable optical disk 31, it should be appreciated by those skilled in the art that other types of computer readable media that can store data that is accessible by a computer, such as magnetic cassettes, flash memory cards, digital video disks, Bernoulli cartridges, random access memories (RAMs), read-only memories (ROMs) and the like may also be used in the exemplary operating environment.

A number of program modules may be stored on the hard disk, magnetic disk 29, optical disk 31, ROM 24 or RAM 25, including an operating system 35. The computer 20 includes a file system 36 associated with or included within the operating system 35, one or more application programs 37, other program modules 38 and program data 39. A user may enter commands and information into the computer 20 through input devices such as a keyboard 40 and pointing device 42. Other input devices (not shown) may include a microphone, joystick, game pad, satellite dish, scanner or the like.

These and other input devices are often connected to the processing unit 21 through a serial port interface 46 that is coupled to the system bus, but may be connected by other interfaces, such as a parallel port, game port or universal serial bus (USB). A monitor 47 or other type of display device is also connected to the system bus 23 via an interface, such as a video adapter 48. In addition to the monitor 47, personal computers typically include other peripheral output devices (not shown), such as speakers and printers.

The computer 20 may operate in a networked environment using logical connections to one or more remote computers 49. The remote computer (or computers) 49 may be another computer, a server, a router, a network PC, a peer device or other common network node, and typically includes many or all of the elements described above relative to the computer 20, although only a memory storage device 50 has been illustrated. The logical connections include a local area network (LAN) 51 and a wide area network (WAN) 52. Such networking environments are commonplace in offices, enterprise-wide computer networks, Intranets and the Internet.

When used in a LAN networking environment, the computer 20 is connected to the local network 51 through a network interface or adapter 53. When used in a WAN networking environment, the computer 20 typically includes a modem 54 or other means for establishing communications over the wide area network 52, such as the Internet.

The modem 54, which may be internal or external, is connected to the system bus 23 via the serial port interface 46. In a networked environment, program modules depicted relative to the computer 20, or portions thereof, may be stored in the remote memory storage device. It will be appreciated that the network connections shown are exemplary and other means of establishing a communications link between the computers may be used.

Having thus described a preferred embodiment, it should be apparent to those skilled in the art that certain advantages of the described method and apparatus have been achieved. In particular, those skilled in the art would appreciate that the proposed system and method provide for efficient processing of the system errors caused by execution or installation of the software applications.

It should also be appreciated that various modifications, adaptations and alternative embodiments thereof may be made within the scope and spirit of the present invention. The invention is further defined by the following claims.

APPENDIX

[04bc] CreateFileW(0x0015a89c→"C:\\DOCUME~1\\ADMINI~1\\LOCALS~1\\Temp\\eb0.TMP", 0x80000000→GENERIC_READ, 0x1→FILE_SHARE_READ, NULL, 0x3→OPEN EXISTING, 0x80→FILE_ATTRIBUTE_NORMAL, 0x0), retaddr=0x00405f7a=>0x48→"C:\Documents and Settings\Administrator\Local Settings\Temp\eb0.TMP"
bpxPatch on addr 0x00405f7a, new EAX val: 0x00000000
bpxPatch on addr 0x00405f7a, new EAX val: 0x00000000
[04bc] CloseHandle(0x0), retaddr=0x00405f95=>false
[04bc] DeleteFileW(0x0015a89c→"C:\\DOCUME~1\\ADMINI~1\\LOCALS~1\\Temp\\eb0. TMP"), retaddr=0x00405fe5, [File="C:\Documents and Settings\Administrator\Local Settings\Temp\eb0.TMP"]=>false
[04bc] LoadResource(0x00000000→"C:\runme.exe", 0x0040f9e0), retaddr=0x004061f3=>0x0041eb74
[04bc] SizeofResource(0x00000000→"C:\runme.exe", 0x0040f9e0), retaddr=0x00406277=>0x2bd81
[04bc] SetHandleCount(0x41eb74), retaddr=0x00406282=>0x41 eb74
[04bc] CreateFileW(0x0015a40c→"C:\\DOCUME~1\\ADMINI~1\\LOCALS~1\\Temp\\eb0.TMP", 0xc0000000→GENERIC_WRITE|GENERIC_READ, 0x1→FILE_SHARE_READ, NULL, 0x2→CREATE_ALWAYS, 0x80→FILE_ATTRIBUTE_NORMAL, 0x0), retaddr=0x004063d4=>0xffffffff→INVALID_ HANDLE_VALUE
[04bc] RtlGetLastWin32Error( ), retaddr=0x004064c4=>0x20→ERROR_SHARING_VIOLATION
[04bc] GetSystemTime(0x0012fc7c), retaddr=0x004074a6
[04bc] CreateDirectoryW(0x0015a4ac→"C:\\WINDOWS\\system32\\Macromed\\Flash", NULL), retaddr=0x0040601b=>false
[04bc] RtlGetLastWin32Error( ), retaddr=0x00406029=>0x3→ERROR_PATH_NOT_FOUND
[04bc] CreateDirectoryW(0x0015a5fc→"C:\\WINDOWS\\system32\\Macromed", NULL), retaddr= 0x0040601b=>true
[04bc] CreateDirectoryW(0x0015a4ac→"C:\\WINDOWS\\system32\\Macromed\\Flash", NULL), retaddr=0x004060bd=> true
[04bc] CreateFileW(0x0015a57c→"C:\\WINDOWS\\system32\Macromed\\Flash\\FlashInstall.log", 0x4→FILE_APPEND_DATA, 0x1→FILE_SHARE_READ, NULL, 0x4→OPEN ALWAYS, 0x80→FILE_ATTRIBUTE_NORMAL, 0x0), retaddr= 0x004063d4=>0x4c→"C:\WINDOWS\system32\Macromed\Flash\FlashInstall.log"

[04bc] SetFilePointer(0x4c→"C:\WINDOWS\system32\Macromed\Flash\FlashInstall.log", 0x0, NULL, 0x2→FILE_END), retaddr=0x00406402=>0x0

[04bc] WriteFile(0x4c→"C:\WINDOWS\system32\Macromed\Flash\FlashInstall.log", 0x0015aa6c, 0x1be, 0x0012fca4, NULL), retaddr=0x00405ca4, [File="C:\WINDOWS\system32\Macromed\Flash\FlashInstall.log"]=>true

[04bc] CloseHandle(0x4c→"C:\WINDOWS\system32\Macromed\Flash\FlashInstall.log"), retaddr=0x00405 ccb Dumping:

"flashplayer10_3r181_34_win.exe.imul/FS/C/WINDOWS/SYSTEM32/MACROMED/FLASH//FLASHINSTALL.LOG" parent: 'RUNME.EXE' =>true

[04bc] ExitProcess(0x401), retaddr=0x004027a2 Dumping runme.exe
EXT_EXT

What is claimed is:

1. A computer-implemented system for processing errors occurring during execution of an application, the system comprising:
an emulator that is configured for:
replicating a state of the computer system so as to trigger an application execution error;
executing the application; and
detecting at least one error and obtaining causes of the error;
an expert system, in communication with the emulator, that is configured for:
generating a scenario for processing of the error based on the causes and the state of the computer system; and
updating a database that contains an identifier of the error, the causes of the error, the state of the computer and the scenario, including updating an application error tree that includes the identifier of the error, the causes of the error, and the state of the computer, the error tree maintaining cumulative information about the errors; and
an error processor, coupled to the database, that is configured for:
identifying an occurrence of the error; and
loading the scenario, out of multiple scenarios stored in the database; and
running the loaded scenario.

2. The system of claim 1, wherein the scenario comprises installing an application update.

3. The system of claim 1, wherein the emulator is configured to detect and process exceptions.

4. The system of claim 1, wherein the expert database is updated with error-related data.

5. The system of claim 4, wherein the error-related data is any of:
execution conditions that triggered the error;
an error return code;
an error correction script; and
computer system configuration parameters.

6. The system of the claim 1, wherein the emulator is configured to perform a partial emulation of the client computer system.

7. The system of claim 1, wherein data produced by the emulator is logged by the emulator.

8. The system of claim 1, wherein application analysis is performed on a remote server connected to the administration server.

9. The system of claim 1, wherein the emulator comprises:
a virtual processor;
a virtual memory;
a log module;
a request processor;
a file system;
an I/O device; and
a virtual network connector.

10. A computer-implemented method for processing errors occurring during execution of an application, the method comprising:
loading an application for execution in an emulator;
emulating at least one state of the computer so as to trigger at least one error during the execution of the application;
detecting the error and causes of the error;
generating a scenario for processing the error;
updating an expert database with an identifier of the error, the causes of the error, the state of the computer and the scenario, including updating an application error tree that includes the identifier of the error, the causes of the error, and the state of the computer, the error tree maintaining cumulative information about the errors;
launching the application on the computer system without emulation;
upon an occurrence of the same error, processing the error using the scenario.

11. The method of claim 10, further comprising detecting and processing exceptions.

12. The method of claim 10, further comprising recording the error codes into a log.

13. The method of claim 10, wherein the errors are returned by API calls.

14. The method of claim 10, further comprising emulation an execution of multiple states of the application and generating error processing instructions.

15. The method of claim 10, wherein behavior of the application is traced and, in the event of error detection, an error processing scenario is invoked.

16. The method of claim 10, further comprising identifying functions that do not produce errors and omitting these functions from the emulating.

17. The method of claim 10, wherein the error processing instructions include error prevention instructions.

18. The method of claim 10, wherein the emulator uses a processing cache for temporary data storage.

19. The method of claim 10, wherein the emulator emulates functionality of external devices connected to the user computer system.

20. The method of claim 10, wherein the application is an installer.

* * * * *